(12) United States Patent
Isaksen

(10) Patent No.: US 7,092,408 B1
(45) Date of Patent: Aug. 15, 2006

(54) PLESIOCHRONOUS SYNCHRONIZATION OF REMOTE SUBSCRIBER'S CLOCK TO HUB'S CLOCK

(75) Inventor: David Bruce Isaksen, Mountain View, CA (US)

(73) Assignee: WideBand Semiconductors, Inc., Mountain View, CA (US)

( * ) Notice: Subject to any disclaimer, the term of this patent is extended or adjusted under 35 U.S.C. 154(b) by 339 days.

(21) Appl. No.: 10/639,926

(22) Filed: Aug. 12, 2003

(51) Int. Cl.
*H04J 3/08* (2006.01)
*H04L 7/00* (2006.01)
*H04L 7/04* (2006.01)

(52) U.S. Cl. .................. 370/503; 375/356; 375/362
(58) Field of Classification Search ........... 370/310, 370/350, 503; 375/354, 356, 362
See application file for complete search history.

(56) References Cited

U.S. PATENT DOCUMENTS

| | | | |
|---|---|---|---|
| 5,265,128 A * | 11/1993 | Widmer et al. ............ | 375/285 |
| 5,422,909 A * | 6/1995 | Love et al. ............... | 375/147 |
| 6,278,741 B1 | 8/2001 | Danzer et al. | |
| 2002/0039394 A1 * | 4/2002 | Buchwald et al. .......... | 375/355 |
| 2002/0039395 A1 | 4/2002 | Buchwald et al. | |
| 2002/0150190 A1 | 10/2002 | Parr et al. | |
| 2002/0193073 A1 * | 12/2002 | Fujioka ...................... | 455/41 |
| 2003/0138061 A1 * | 7/2003 | Li ............................... | 375/326 |

* cited by examiner

*Primary Examiner*—Kevin C. Harper
(74) *Attorney, Agent, or Firm*—Boris G. Tankhilevich

(57) ABSTRACT

A method and apparatus for plesiochronous synchronization of an integer N plurality of subscriber networks to a hub network. Each subscriber network including a sub's clock, and the hub network includes a hub's clock. The method comprises the following steps: (A) broadcasting a plurality of control data from the hub network to each sub network; (B) transmitting back to the hub network a first sub's network ID number (sub_id#1) in a first separate channel (channel#1) and waiting for hub's instructions to burst back; (C) bursting a set of data from the hub network to he first sub network having the sub_id#1; (D) acquiring a hub frequency by the first sub network having the sub_id#1 and locking a sub_id#1 frequency on to the hub frequency; (E) re-adjusting the sub_id#1 frequency so that the sub_id#1 frequency is substantially equal to the hub frequency; and (F) repeating steps (B–E) for each 'i-th' sub's network having an 'i-th' sub's network ID number (sub_id#i); wherein integer 'i' is greater than one and less or equal to N.

10 Claims, 3 Drawing Sheets

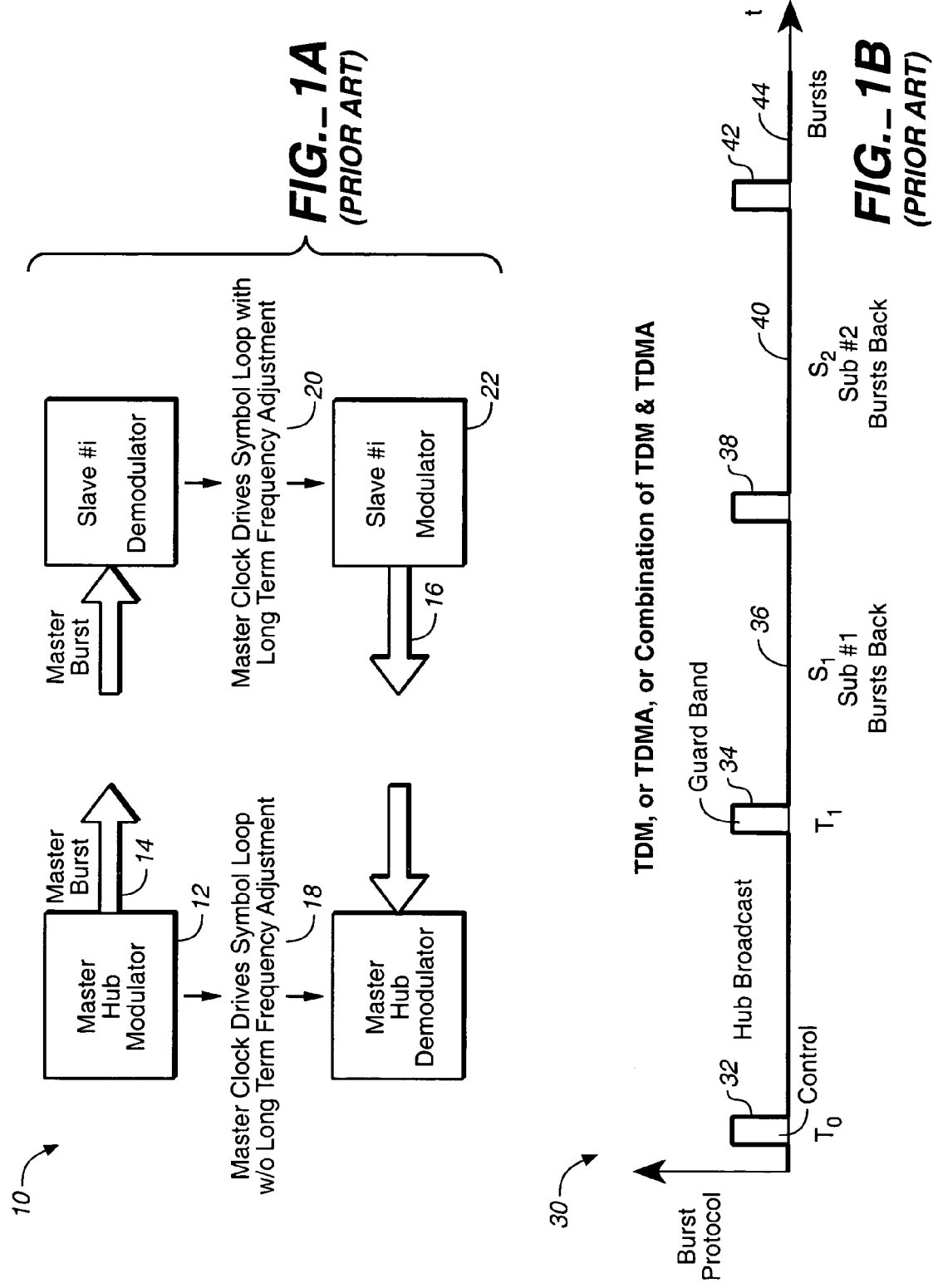

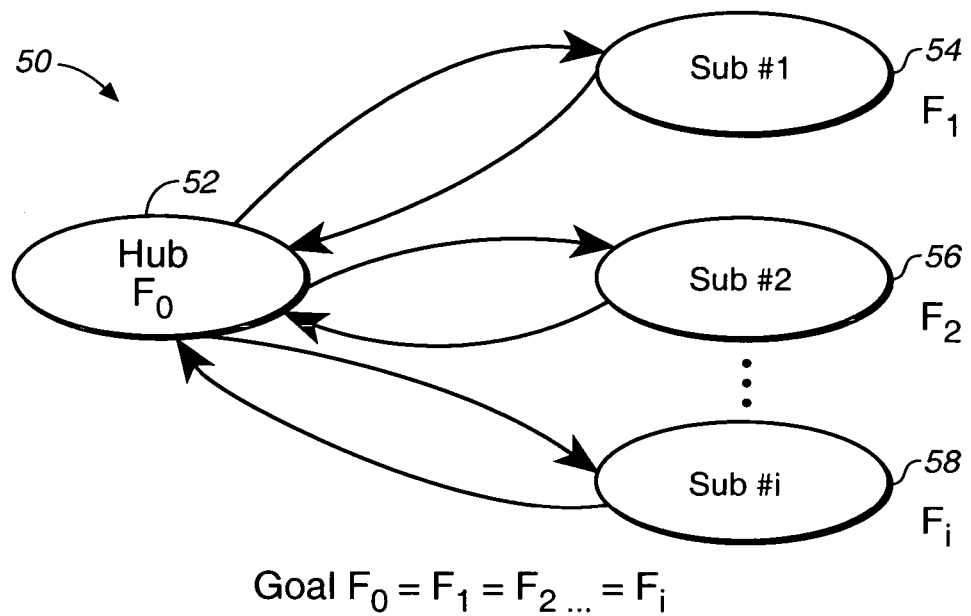
Goal $F_0 = F_1 = F_2 ... = F_i$
FIG._1C
(PRIOR ART)
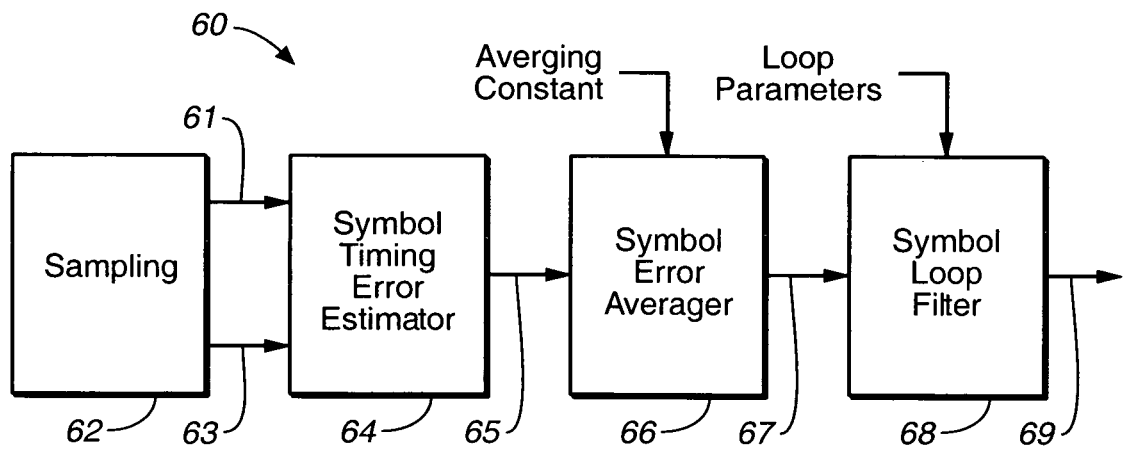
FIG._2
(PRIOR ART)

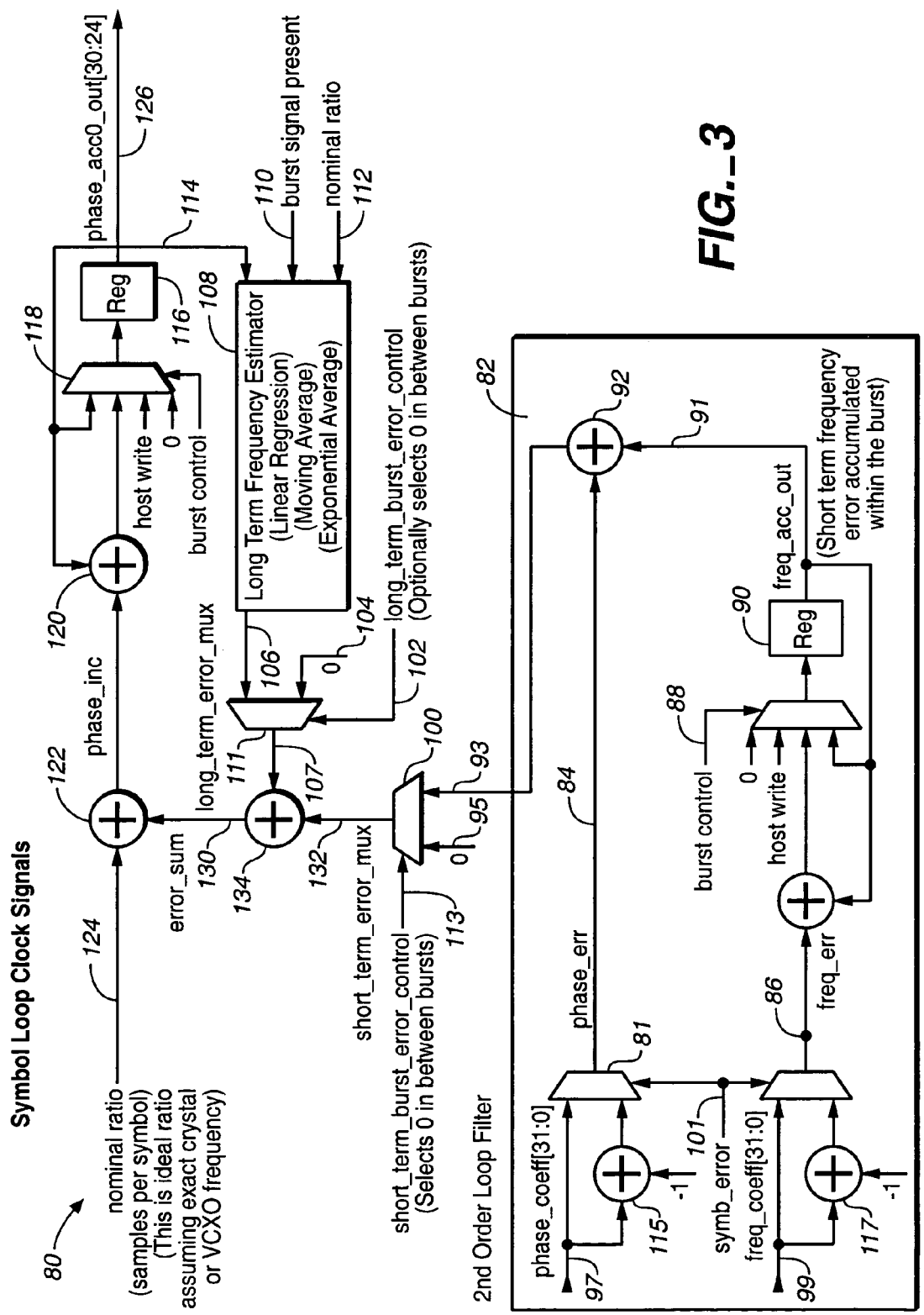
FIG._3

PLESIOCHRONOUS SYNCHRONIZATION OF REMOTE SUBSCRIBER'S CLOCK TO HUB'S CLOCK

BACKGROUND OF THE INVENTION

1. Field of the Invention

The present invention relates to the field of the digital signal processing, and more specifically, to the field of plesiochronous synchronization of at least two independently synchronous networks.

2. Discussion of the Prior Art

Timekeeping requires not only accurate frequency control but also accurate time transfer from some master source. Therefore, timekeeping involves comparing two or more clocks to ensure that their time difference is kept within predefined limits over a specified interval. Such a system either can provide relative (synchronized) or absolute timekeeping.

In a synchronized system, each clock is in step with every other clock in the system, but there is no requirement that these clocks to be synchronized to some master clock outside the system. The absolute system, on the other hand, keeps each clock in step with every other clock in the system and also with some master clock outside the system. In large telecommunications networks, the absolute system is used and synchronization is kept with an internationally accepted time scale, such as universal coordinated time (UTC). Smaller networks that have no external time reference use a simple synchronized system.

Notwithstanding the desirability of overall network synchronization, timing islands, or isolated networks, exist as a rule. It means that not all digital telecommunication systems are tied to a large network or even the public network, and not all networks are tied together. This latter situation is especially apparent when international networks are taken into account. Indeed, each country wants to control the timing functions of its national network, so that the master-slave relationship do not exist across international boundaries. The inter-working of such networks requires a standardized and tightly controlled approach to inter-network synchronization. National networks are normally internally synchronized, and when connected to other synchronous networks across international boundaries, are plesiochronous.

The term plesiochronous is derived from the Greek plesio, meaning near, and chronos, time, and refers to the fact that plesiochronous systems run in a state where different parts of the system are almost, but not quite perfectly, synchronized. According to ITU-T, that stands for the Telecom Standardization Organization, previously known as CCITT, of the International Telecommunication Union (ITU), corresponding signals are plesiochronous if their significant instants occur at nominally the same rate, with any variation in rate being constrained within specified limits. In general, plesiochronous systems behave similarly to synchronous systems, except that they must have some means to cope with "sync slips", which will happen at intervals due to the plesiochronous nature of the system.

The most common example of a plesiochronous system design is the Plesiochronous Digital Hierarchy networking standard. The modern tendency in systems engineering is towards using systems that are either fundamentally asynchronous, such as Ethernet, or fundamentally synchronous, such as Synchronous Digital Hierarchy (SDH), and layering these where necessary, rather than using a mixture between the two in a single technology.

However, if two or more independently synchronized digital networks are not connected, it is a difficult task to make those digital networks plesiochronous. One way to solve this problem is to use the burst communication signals between those digital networks to make them plesiochronous.

Thus, what is needed is to design a technique that utilizes burst communication signals among independently synchronized digital networks to make them plesiochronous.

SUMMARY OF THE INVENTION

To address the shortcomings of the available art, the present invention provides a method of plesiochronous synchronization of an integer N plurality of subscriber networks to a hub network, wherein each subscriber network includes a sub's clock, and wherein the hub network includes a hub's clock.

In one embodiment of the present invention, the method comprises the following steps: (A) broadcasting a plurality of control data from the hub network to each sub network; (B) transmitting back to the hub network a first sub's network ID number (sub_id#1) in a first separate channel (channel#1) and waiting for hub's instructions to burst back; (C) bursting a set of data from the hub network to the first sub network having sub_id#1; (D) acquiring a hub frequency by the first sub network having sub_id#1 and locking a sub_id#1 frequency on to the hub frequency; (E) re-adjusting the sub_id#1 frequency so that the sub_id#1 frequency is substantially equal to the hub frequency; and (F) repeating the steps (B–E) for each 'i-th' sub's network having an 'i-th' sub's network ID number (sub_id#i); wherein integer 'i' is greater than one and less or equal to N.

In one embodiment of the present invention, the step (D) of acquiring the hub frequency by the sub_id#1 network and locking the sub_id#1 frequency on to the hub frequency further includes the step of using at least one burst from the hub to at least one previously installed user to acquire the hub frequency and to lock the sub_id#1 frequency on to the hub frequency.

In one embodiment of the present invention, the step (D) of acquiring the hub frequency by the sub_id#1 network and locking the sub_id#1 frequency on to the hub frequency further includes the step of using a training burst from the hub to acquire the hub frequency and to lock the sub_id#1 network frequency on to the hub frequency.

In one embodiment of the present invention, the step (E) of re-adjusting the sub_id#1 network frequency further includes the following steps: (E1) substantially continuously measuring a short term hub's frequency error accumulated within a single burst by using a short term phase error loop filter of the sub_id#1 network; (E2) substantially continuously estimating a long term hub's frequency error accumulated within at least two bursts by using a long term frequency estimator of the sub_id#1 network; (E3) substantially continuously generating a correction command by using the symbol loop filter of the sub_id#1 network; (E4) substantially continuously digitally re-sampling a sample rate of the sub_id#1 network based on the correction command by using the sub_id#1 network sampling block; and (E5) repeating the steps (E1–E4) for a plurality of bursts.

In one embodiment of the present invention, the step (E1) of substantially continuously measuring the short term hub's frequency error further includes the steps of: (E1,1) using a 2-nd order error loop filter to measure and to output the short term hub's frequency error accumulated within a single burst; and (E1,2) using a short term error multiplexer to select between the short term hub's frequency error accumulated within the single burst and a zero signal output in between at least two consecutive bursts.

In one embodiment of the present invention, the step (E1,1) of using the 2-nd order error loop filter to measure and to output the short term hub's frequency error accumulated within the single burst further includes the following steps: using a frequency accumulator to generate an integrated frequency error signal accumulated within the single burst; using a phase error detector to generate a phase error signal within the single burst for each sampling instant; and using an adder to sum the phase error signal generated within the single burst and the integrated frequency error signal accumulated within the single burst and to output the short term hub's phase error signal within the single burst for each sampling instant.

In one embodiment of the present invention, the step (E2) of substantially continuously estimating the long term hub's frequency error accumulated within at least two bursts by using the long term frequency estimator of the sub_id#1 network further includes the following steps: (E2,1) initializing a total phase error register; (E2,2) substantially continuously estimating a long term frequency error accumulated within at least two consecutive bursts; (E2,3) if the long term frequency error estimate accumulated within the at least two consecutive bursts is greater than a predetermined threshold, outputting the long term frequency error estimate accumulated within the at least two consecutive bursts; and (E2,4) if the long term frequency error estimate accumulated within the at least two consecutive bursts is less than or equal to the predetermined threshold, outputting a zero long term phase error signal.

In one embodiment of the present invention, the step (E2,2) of substantially continuously estimating the long term frequency error accumulated within at least two consecutive bursts further includes the step of using a linear regression operation on a plurality of symbols within at least the two consecutive bursts. In another embodiment of the present invention, the step (E2,2) of substantially continuously estimating the long term frequency error accumulated within at least two consecutive bursts further includes the step of using a moving average operation on a plurality of symbols within at least the two consecutive bursts. In one more embodiment of the present invention, the step (E2,2) of substantially continuously estimating the long term frequency error accumulated within at least two consecutive bursts further includes the step of using an exponential average operation on a plurality of symbols within at least the two consecutive bursts.

In one embodiment of the present invention, the step (E3) of substantially continuously generating the correction command further includes the step of adding short term frequency error signal accumulated within the single burst and the long term frequency error accumulated within at least two consecutive bursts to generate a total phase error correction command. The total phase error correction command is used for advancing or delaying a sample timing of a modem front end used to recover data from each incoming from the hub burst signal having maximum/minimum.

Another aspect of the present invention is directed to an apparatus for plesiochronous synchronization of the sub to a hub network, wherein the hub network includes a hub's clock.

In one embodiment of the present invention, the apparatus for plesiochronous synchronization of the sub to a hub network comprises a symbol loop filter and a re-sampler, wherein the symbol loop filter further comprises: (1) a short term phase error loop filter configured to substantially continuously measure a short term frequency error accumulated within a single burst; (2) a long term frequency estimator configured to substantially continuously estimate a long term frequency error accumulated within at least two bursts; and (3) a total phase error phase register configured to substantially continuously generate a total phase correction command; wherein the total phase correction command is used for advancing or delaying a sample timing of a modem front end used to recover data from each incoming from the hub burst signal having maximum/minimum.

In one embodiment of the present invention, the short term phase error loop filter further comprises a 2-nd order error loop filter configured to measure and to output the short term phase error accumulated within a single burst, and a short term error multiplexer configured to select between the short term frequency error accumulated within the single burst and a zero signal output in between at least two consecutive bursts.

In one embodiment of the present invention, the 2-nd order error loop filter further comprises: a frequency accumulator configured to generate an integrated frequency error signal accumulated within the single burst, a phase error detector configured to generate a phase error signal within the single burst for each sampling instant, and an adder configured to sum the phase error signal generated within the single burst and the integrated frequency error signal accumulated within the single burst and configured to output the short term hub's phase error signal within the single burst for each sampling instant.

In one embodiment of the present invention, the long term frequency estimator further comprises a block configured to perform a linear regression operation on a plurality of symbols within at least the two consecutive bursts. In another embodiment of the present invention, the long term frequency estimator further comprises a block configured to perform a moving average operation on a plurality of symbols within at least the two consecutive bursts. Yet, in one more embodiment of the present invention, the long term frequency estimator further comprises a block configured to perform an exponential average operation on a plurality of symbols within at least the two consecutive bursts.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1A depicts a prior art basic master-slave burst communication topology including the hub (master) network including a master clock, wherein each 'i'-th sub network having sub_id#i ID number is assumed to be a slave network including a slave clock.

FIG. 1B illustrates the burst protocol (or a predetermined sequence of bursts between the master and each slave) of the plesiochronous synchronization between each sub's (slave's) clock and the hub (master) clock.

FIG. 1C schematically shows the plesiochronous synchronization between each sub's (slave's) clock and the hub (master) clock by eliminating the frequency offset between each sub's frequency and the hub's frequency.

FIG. 2 depicts a block diagram of a timing recovery circuit in QAM modems of the '741 patent.

FIG. 3 depicts a symbol loop filter block of the present invention configured to perform a plesiochronous synchronization operation for each of the subscriber networks to a hub network, in addition to all functions performed by the symbol loop filter block of the '741 patent.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Using the master-slave terminology, FIG. 1A depicts a prior art basic master-slave burst communication topology 10 including the hub (master) network 12 including a master clock 18, wherein each 'i'-th sub network 22 having sub_id#i ID number is assumed to be a slave network including a slave clock 20.

A good example of a burst communication system is a time-division multiple access (TDMA) communication system, whereas the available spectrum is used letting each user have access to the whole band for a short time (bursts), during which the user transmits data at the maximum rate. The user's frequency allocation is shared with other users who are assigned different time slots. Thus, in a TDMA-type burst communication system, the signals exist for a short period of time, and there are severe time constraints placed on the receiver to acquire both phase and frequency lock for the symbol timing loop. Several variations of TDMA systems may exist. Two of these are:

(1) A full-duplex hub-spoke configuration where the hub transmits continuously to all users and the users transmit back to the hub within prescribed time slots. In this arrangement, 2 distinct frequencies are used.

(2) A half-duplex or TDD hub-spoke configuration where the hub transmits to all users at prescribed time slots and the users transmit back to the hub within prescribed time slots. In this arrangement, a single frequency is used.

As illustrated in FIG. 1B, the burst protocol 30 is assumed to be known and once it achieves synchronization with the hub, the sequence of bursts between the master and each slave is known to each slave in advance, so that it is fully predictable when the next burst will occur. The burst protocol 30 also includes a plurality of guard bands 34, 38, 42, etc. The guard band 34 is located between the time frame $T_0$ 32 allocated for the master burst transmission and the time frame 36 allocated for the burst back transmission from the sub's #1 to the hub. Similarly, the guard band 38 is located between the time frame 36 allocated for the sub's #1 burst back transmission and the time frame 40 allocated for the sub's#2 burst back transmission. There is also the guard band 42 allocated between the time frame 40 allocated for the sub's#2 burst back transmission and the time frame for the next hub's burst transmission 44. The guard bands insure that there is no interference between the burst from hub to a sub and the bursts back between each sub and the hub. Preferably, the guard bands should be made very small so that they would not be limiting factors for the various transmission protocol scenarios.

Referring still to FIG. 1A, typically, the hub (master) network 12 includes a $VCXO_{master}$ (voltage controlled crystal oscillator) master clock 18, whereas each sub (slave) network 22 having sub_id#i ID number includes a $VCXO_{slave}$ slave clock 20 which is typically off from the $VCXO_{master}$ master clock 18 by several parts per million (ppm). By achieving the plesiochronous synchronization between each sub's (slave's) clock 20 and the hub (master) clock 18, we substantially eliminate the timing clock offset between each sub's (slave's) clock and the hub (master clock).

EXAMPLE I

The hub's clock has a long term accuracy of 10 ppm; the sub#1's clock has a long term accuracy of (−) 6 ppm; thus the short term offset $\Delta$ between the hub's clock and the sub#1'clock: $\Delta=16$ ppm. The goal is to eliminate this short term offset $\Delta$ between the hub's clock and the sub#1'clock within several bursts. In addition, there is also a long term offset $\delta$ between the hub's clock and the sub#1'clock due to the temperature fluctuations, aging effects, etc. The typical values for the long term offset $\delta$ are within (1–2) ppm, so that the long term offset $\delta$ is much smaller than the short term offset $\Delta$: $\delta \ll \Delta$. Typically, the long term offset $\delta$ is eliminated gradually, within much longer time of communication between the hub and a sub (for instance, within 100's bursts of communication).

As it is fully disclosed below, the plesiochronous synchronization between each sub's (slave's) clock (54, 56, 58) and the hub (master) clock 52 is performed by eliminating the frequency offset between each sub's frequency and the hub's frequency, as schematically shown in the diagram 50 of FIG. 1C.

In the U.S. Pat. No. 6,278,741, entitled "TIMING RECOVERY CIRCUIT IN QAM MODEMS", and assigned to the assignee of the present patent application, a timing recovery system which can operate on QAM signals having different symbol rates is disclosed. The '741 patent is incorporated herein in its entirety.

FIG. 2 depicts a block diagram 60 of a timing recovery circuit in QAM modems of the '741 patent. A sampler circuit 62 is configured to sample a QAM baseband signal by using two low pass filters $\sqrt{N}$ having the square root of the Nyquist shape (not shown). As it is known to a person skillful in the art, the usage of two $\sqrt{N}$ filters allows the timing recovery circuit to maximize the SNR of the signal coming out from the communication channel. A symbol error timing block 64 is configured to process the sampled QAM baseband signal and configured to develop a local error signal 65. The two low pass filters $\sqrt{N}$ output a symbol that is transmitted by the communication channel as two half symbols 61 for the I channel and 63 for the Q channel respectively. The local error signal 65 is accumulated in the register block (not shown) that updates the local pre-averaged error signal per symbol. The updated once per symbol local error signal 65 is input into the symbol error averaging circuit 66.

Referring still to FIG. 2, as disclosed in '741 patent, the error averaging circuit 66 is configured to average the local error signal over a predetermined time period. According to the Nyquist theorem, the averaging logic block 66 is configured to operate at at least twice the symbol rate. In one embodiment, the averaging block 66 comprises an exponential averaging logic (not shown) that assigns the most weight to the most recent symbol. In one embodiment, the exponential averaging logic 66 operates at twice the symbol rate.

Referring still to FIG. 2, according to '741 patent, a symbol loop filter 68 utilizes the averaged local error signal 67 to make a global decision regarding the sampling point position relative to the baseband signal maximum/minimum. The symbol loop filter 68 (of '741 patent) utilizes the phase error detector (not shown) to generate a feedback signal 69. The most significant bit (MSB) of the feedback signal generated by the phase detector (not shown) is used to detect the sign of the feedback signal in order to make a determination whether to advance or delay the sampling point. The more precise information about the feedback signal may be obtained if other bits of the feedback signal are utilized. In one embodiment (of '741 patent), a phase detector includes a lookup table (not shown). If this is the case, the lookup table can be designed in such a way that the phase detector can detect the phase of the averaged error signal with a predetermined resolution.

FIG. 3 depicts a symbol loop filter block 80 of the present invention. The symbol loop filter block 80 should be used instead of the symbol loop filter block 68 of the '741 patent in each sub's network in order to perform a plesiochronous synchronization operation of the each of the subscriber networks to a hub network, in addition to all functions performed by the symbol loop filter block 68 of the '741 patent.

In one embodiment of the present invention, the symbol loop filter block 80 further comprises: (a) a short term phase error loop filter configured to substantially continuously measure a short term frequency error accumulated within a single burst; (b) a long term frequency estimator 108 configured to substantially continuously estimate a long term frequency error accumulated within at least two bursts; (c) and a total phase error phase register 116 configured to substantially continuously generate a total phase correction command 126. The total phase correction command 126 is used for advancing or delaying a sample timing of a modem front end used to recover data from each incoming from the hub burst signal having maximum/minimum, as was fully disclosed in '741 patent.

In one embodiment of the present invention, the short term phase error loop filter further comprises a 2-nd order error loop filter 82 configured to measure and to output the short term phase error accumulated within a single burst, and a short term error multiplexer 100 configured to select between the short term frequency error 93 accumulated within the single burst and a zero signal output 95 in between at least two consecutive bursts.

In one embodiment of the present invention, the 2-nd order error loop filter 82 further comprises: a frequency accumulator 90 configured to generate an integrated frequency error signal 91 accumulated within the single burst, and a phase error detector 81 configured to generate a phase error signal 84 within the single burst for each sampling instant. In one embodiment, a state machine (not shown) is configured to pre-compute a set of phase coefficients 97 and a set of frequency coefficients 99.

Referring still to FIG. 3, in one embodiment of the present invention, the short term phase error loop filter 82 further comprises an adder 92 configured to sum the phase error signal 84 generated within the single burst and the integrated frequency error signal 91 accumulated within the single burst and configured to output the short term hub's phase error signal 93 within the single burst for each sampling instant.

In one embodiment of the present invention, after a hub's burst signal comes in, the short term phase error loop filter 82 measures the sign of the symbol error 101. The symbol error signal 101 is used to obtain the frequency offset between the hub's frequency and the sub's frequency. The short term phase error loop filter 82 runs the frequency updates for as many bursts as necessary to obtain a lock on the hub's frequency. If it takes M symbols to close the frequency loop, and if the burst includes less than M symbols, it might take several bursts to close the frequency loop.

EXAMPLE II

For a QPSK modulated hub's burst signal, a typical burst lasts about 1,000 symbols, and it takes M=100 symbols to close the frequency loop. So we have a frequency lock on the hub's carrier frequency within the first burst.

So, typically the hub's network uses the QPSK modulation for its first burst to facilitate the lock, and other types of modulation once the frequency lock has been achieved.

EXAMPLE III

For a 256 QAM modulated hub's burst signal, a typical burst lasts about 1,000 symbols, and it takes about M≈several thousands symbols to close the frequency loop. So we might need several bursts to achieve a frequency lock on the hub's carrier frequency.

Referring still to FIG. 3, after the frequency lock has been achieved during a single burst, or during several bursts depending, as was explained above, on the type of modulation used, the short term phase error loop filter 82 takes at most a single additional burst to measure the frequency offset between the hub's carrier and the sub's carrier, that is the short term frequency error accumulated within the single burst. The measured value of the short term frequency error is accumulated in the register 90 within the single burst to generate a frequency offset component of the total short term phase offset signal 93, as explained below.

Indeed, to get a more precise value of the short term frequency error accumulated within the single burst, the short term phase error loop filter 82 also obtains a phase offset (or a phase error) 84 within a single burst. Within a single burst, a carrier frequency can experience some jitter. So, the short term loop filter will have to track the hub's carrier to take care of the short term frequency jitter. The phase offset, on the other hand, can take care of the long term frequency deviation.

In one embodiment of the present invention, once the phase offset is measured in the block 81 and outputted as a signal 84, it is added in the adder 92 with the phase error signal in the register 90 within the single burst frequency offset 91 to generate a total short term phase offset 93 for each sampling instant.

In one embodiment of the present invention, the short term phase offset error signal 93 is replaced by a zero signal 95 in between the bursts in the multiplexer 100 under control of the short_term_error_control signal 113. In the beginning of the next burst, the latest known values of a carrier frequency from the prior burst are used as values of phase coefficient 115 and frequency coefficients 117 for the 20nd order loop 82 for tracking the next hub's burst and locking on the next sub's burst. To start the tracking loop, one needs to input also the nominal ratio value 124. For microwave radio, the nominal ratio (or the sample/per symbol ratio) is 2,5. For satellite applications, the nominal ratio is between 2 and 4. The higher the sample rate, the lower the quantization noise present in the burst signal.

The plesiochronous synchronization of remote subscriber's clock to hub's clock is achieved when the total phase offset becomes zero. (Please, see the full discussion below). In one embodiment of the present invention, in the first scenario, (QPSK modulation) if the lock is achieved within M symbols of the single burst, and if the single burst lasts about 1000 symbols (M≦1000), one might need another M symbols to achieve the plesiochronous synchronization within the same single burst. In one embodiment of the present invention, in the second scenario, (256 QAM modulation) the single burst lasts about 1000 symbols, and it takes M≈several thousands symbols to achieve the frequency lock, that is it takes several bursts to achieve the frequency lock. It might take additionally several bursts to achieve the plesiochronous synchronization. If this is the case, the long term frequency estimation is necessary to estimate the affect of the long term frequency error offset on the process of hub's carrier tracking, locking, and the plesiochronous synchronization.

However, in any kind of scenario, the long term frequency error offset is also due to long term effects like temperature fluctuations, aging of the network components, etc.

In one embodiment of the present invention, the long term frequency estimator 108 further comprises a block configured to perform a linear regression operation on a plurality of symbols within at least the two consecutive bursts. Linear regression is used to make predictions about a single value. Simple linear regression involves discovering the equation for a line that most nearly fits the given data. That linear equation is then used to predict values for the data.

A predictor variable can be defined as a variable which is used to estimate some characteristic or response. A regression analysis which involves only one predictor is called Simple Linear Regression Analysis. The general regression equation for the long term frequency estimator 108 can be written as follows:

<long term burst error>$_{linear\ regression}$=[a+b(plurality of symbols within at least the two consecutive bursts)]; (Eq. 1)

where 'a' and 'b' are coefficients that are selected to make the data fit the equation for a line. In order to predict a variable {long term burst error}, we need to find the mean, variance, deviation and standard deviation of the values of {plurality of symbols within at least the two consecutive bursts} and {a long term burst error}.

In another embodiment of the present invention, the long term frequency estimator 108 further comprises a block configured to perform a moving average operation on a plurality of symbols within at least the two consecutive bursts. According to the moving average filter theory, any periodic waveform can be thought of as a long string or collection of data points. The moving average filter algorithm accomplishes a moving average by taking two or more of these data points from the acquired waveform, adding them, dividing their sum by the total number of data points added, replacing the first data point of the waveform with the average just computed, and repeating the steps with the second, third, and so on data points until the end of the data is reached. The result is a second or generated waveform consisting of the averaged data and having the same number of points as the original waveform.

<long term burst error>$_{moving\ average}$=[sum of plurality of symbols except (several last symbols) within at least the two consecutive bursts+average (of several last symbols within at least the two consecutive bursts)]; (Eq. 2)

where the average (of several last symbols within at least the two consecutive bursts) gives a smoothing filtering factor.

Yet, in one more embodiment of the present invention, the long term frequency estimator 108 further comprises a block configured to perform an exponential average operation on a plurality of symbols within at least the two consecutive bursts. An exponential averaging logic assigns the most weight to the most recent symbol.

<long term burst error>$_{exponential\ average}$=[weighted sum of plurality of symbols within at least the two consecutive bursts wherein the most weight is assigned to the most recent symbol]. (Eq. 3)

If the long term frequency estimate 106 is stable, and if the time between received bursts is relatively low, leaving the long-term burst error estimates on between bursts, as opposed to selecting the zero error signal in between the bursts, will actually result in a lower total error estimate at the beginning of the next received burst. If this is the case, the multiplexer 111 is configured to output the long term frequency error estimate 106 as its output signal 107 under control of the long_term_burst_error_control signal 102. Indeed, if the long term error is relatively recent and generally has a stable value, then using the long-term error to update the phase accumulator 118 will result in a lower initial error during the next burst.

However, if the long term estimate is less accurate and the time between bursts is relatively long, one should suppress the long-term error updates in between bursts by having the multiplexer 111 to select zero long term error signal 104 under control of the long_term_burst_error_control signal 102 as its output signal 107.

The total phase offset 130 comprises both the short term error signal 132 and the long term phase error signal 107. The total phase offset is loaded into the register 116 and is used to output the total phase error signal 126 that is used to re-sample the sub's clock in order to adjust the sub's frequency to the hub's frequency, that is to achieve the plesiochronous synchronization of the remote subscriber's clock to hub's clock. More specifically, the total phase error correction command is used for advancing or delaying a sample timing of a modem front end used to recover data from each incoming from the hub burst signal having maximum/minimum, as was fully disclosed in the '741 patent.

In one embodiment of the present invention, in the case of the plesiochronous synchronization of a plurality of hub networks to the hub's clock, the hub network includes the register that includes the frequency and phase registers, wherein each such register stores the parameters for each sub's network. For instance, the parameters include: an initial frequency offset for a particular sub, an initial phase offset for a particular sub, number of symbols and number of bursts, etc. it took to achieve the plesiochronous synchronization for each particular sub's network.

In operation, the method of the plesiochronous synchronization of the remote subscriber's clock to hub's clock comprises the following steps: (A) broadcasting a plurality of control data from the hub network to each sub network; (B) transmitting back to the hub network a first sub's network ID number (sub_id#1) in a first separate channel (channel#1) and waiting for hub's instructions to burst back; (C) bursting a set of data from the hub network to the first sub network having sub_id#1; (D) acquiring a hub frequency by the first sub network having sub_id#1 and locking a sub_id#1 frequency on to the hub frequency; (E) re-adjusting the sub_id#1 frequency so that the sub_id#1 frequency is substantially equal to the hub frequency; and (F) repeating the steps (B–E) for each 'i-th' sub's network having an 'i-th' sub's network ID number (sub_id#i); wherein integer 'i' is greater than one and less or equal to N.

In one embodiment of the present invention, the step (D) of acquiring the hub frequency by the sub_id#1 network and locking the sub_id#1 frequency on to the hub frequency further includes the step of using at least one burst from the hub to at least one previously installed user to acquire the hub frequency and to lock the sub_id#1 frequency on to the hub frequency. In another embodiment of the present invention, the step (D) of acquiring the hub frequency by the sub_id#1 network and locking the sub_id#1 frequency on to the hub frequency further includes the step of using a training burst from the hub to acquire the hub frequency and to lock the sub_id#1 network frequency on to the hub frequency.

In one embodiment of the present invention, the step (E) of re-adjusting the sub_id#1 network frequency further includes the following steps: (E1) substantially continuously measuring a short term hub's frequency error accumulated within a single burst by using a short term phase error loop filter 82 (of FIG. 3) of the sub_id#1 network; (E2) substantially continuously estimating a long term hub's frequency error accumulated within at least two bursts by using a long term frequency estimator 108 (of FIG. 3) of the sub_id#1 network; (E3) substantially continuously generating a correction command 126 by using the symbol loop filter of the sub_id#1 network; (E4) substantially continuously digitally re-sampling a sample rate of the sub_id#1 network based on the correction command by using the sub_id#1 network sampling block (not shown); and (E5) repeating the steps (E1–E4) for a plurality of bursts.

In one embodiment of the present invention, the step (E1) of substantially continuously measuring the short term hub's frequency error further includes the steps of: (E1, 1) using a 2-nd order error loop filter 82 to measure and to output the short term hub's frequency error accumulated within a single burst; and (E1,2) using a short term error multiplexer 100 to select between the short term hub's frequency error 93 accumulated within the single burst and a zero signal output 95 in between at least two consecutive bursts.

In one embodiment of the present invention, the step (E1, 1) of using the 2-nd order error loop filter to measure and to output the short term hub's frequency error 91 accumulated within the single burst further includes the following steps: using a frequency accumulator 90 to generate an integrated frequency error signal accumulated within the single burst; using a phase error detector 81 to generate a phase error signal 84 within the single burst for each sampling instant; and using an adder 92 to sum the phase error signal 84 generated within the single burst and the phase error signal 91 within the single burst for each sampling instant and to output the short term hub's phase error signal 93 within the single burst for each sampling instant.

In one embodiment of the present invention, the step (E2) of substantially continuously estimating the long term hub's frequency error accumulated within at least two bursts by using the long term frequency estimator 108 of the sub_id#1 network further includes the following steps: (E2,1) initializing a total phase error register; (E2,2) substantially continuously estimating a long term frequency error accumulated within at least two consecutive bursts; (E2,3) if the long term frequency error estimate accumulated within the at least two consecutive bursts is greater than a predetermined threshold, using the multiplexer 111 to output the long term frequency error estimate 106 accumulated within the at least two consecutive bursts as the long term error signal 107; and (E2,4) if the long term frequency error estimate accumulated within the at least two consecutive bursts is less than or equal to the predetermined threshold, using the multiplexer 111 to output zero signal 104 as the long term error signal 107 instead of outputting the long term frequency error estimate 106 accumulated within the at least two consecutive bursts as the long term error signal 107. As was explained above, the predetermined threshold is determined depending on whether the long term frequency estimate is stable, and whether the time between the received bursts is relatively low.

In one embodiment of the present invention, the step (E3) of substantially continuously generating the correction command further includes the step of adding short term frequency error signal 132 accumulated within the single burst and the long term frequency error 107 accumulated within at least two consecutive bursts by using an adder 134, and adder 120, and a register 116 to generate a total phase error correction command 126. The total phase error correction command 126 is used for advancing or delaying a sample timing of a modem front end used to recover data from each incoming from the hub burst signal having maximum/minimum.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of plesiochronous synchronization of an integer N plurality of subscriber networks to a hub network, each said subscriber network including a sub's clock; said hub network including a hub's clock; said method comprising the steps of:
    (A) broadcasting a plurality of control data from said hub network to each said sub network;
    (B) transmitting back to said hub network a first sub's network ID number (sub_id#1) in a first separate channel (channel#1) and waiting for hub's instructions to burst back;
    (C) bursting a set of data from said hub network to said first sub network having said sub_id#1;
    (D) acquiring a hub frequency by said first sub network having said sub_id#1 and locking a sub_id#1 frequency on to said hub frequency;
    (E1) substantially continuously measuring a short term hub's frequency error accumulated within a single burst by using a short term phase error loop filter of said sub_id#1 network;

(E2) substantially continuously estimating a long term hub's frequency error accumulated within at least two bursts by using a long term frequency estimator of said sub_id#1 network;

(E3) substantially continuously generating a correction command by using said symbol loop filter of said sub_id#1 network;

(E4) substantially continuously digitally re-sampling a sample rate of said sub_id#1 network based on said correction command by using said sub_id#1 network sampling block;

(E5) repeating said steps (E1–E4) for a plurality of bursts; and (F) repeating said steps (B–E5) for each said 'i-th' sub's network having an 'i-th' sub's network ID number (sub_id#i); wherein integer 'i' is greater than one and less or equal to N.

2. The method of claim 1, wherein said step (E1) of substantially continuously measuring said short term hub's frequency error further includes the steps of:

(E1,1) using a 2-nd order error loop filter to measure and to output said short term hub's frequency error accumulated within a single burst; and (E1,2) using a short term error multiplexer to select between said short term hub's frequency error accumulated within said single burst and a zero signal output in between at least two consecutive bursts.

3. The method of claim 2, wherein said step (E1,1) of using said 2-nd order error loop filter to measure and to output said short term hub's frequency error accumulated within said single burst further includes the steps of:

using a frequency accumulator to generate an integrated frequency error signal accumulated within said single burst;

using a phase error detector to generate a phase error signal within said single burst for each said sampling instant; and using an adder to sum said phase error signal generated within said single burst and said integrated frequency error signal accumulated within said single burst and to output said short term hub's phase error signal within said single burst for each said sampling instant.

4. The method of claim 1, wherein said step (E2) of substantially continuously estimating said long term hub's frequency error accumulated within at least two bursts by using said long term frequency estimator of said sub_id#1 network further includes the steps of:

(E2,1) initializing a total phase error register;

(E2,2) substantially continuously estimating a long term frequency error accumulated within at least two consecutive bursts;

(E2,3) if said long term frequency error estimate accumulated within said at least two consecutive bursts is greater than a predetermined threshold, outputting said long term frequency error estimate accumulated within said at least two consecutive bursts; and (E2,4) if said long term frequency error estimate accumulated within said at least two consecutive bursts is less than or equal to said predetermined threshold, outputting a zero long term phase error signal.

5. The method of claim 4, wherein said step (E2,2) of substantially continuously estimating said long term frequency error accumulated within at least two consecutive bursts further includes the step of:

using a linear regression operation on a plurality of symbols within at least said two consecutive bursts.

6. The method of claim 4, wherein said step (E2,2) of substantially continuously estimating said long term frequency error accumulated within at least two consecutive bursts further includes the step of:

using a moving average operation on a plurality of symbols within at least said two consecutive bursts.

7. The method of claim 4, wherein said step (E2,2) of substantially continuously estimating said long term frequency error accumulated within at least two consecutive bursts further includes the step of:

using an exponential average operation on a plurality of symbols within at least said two consecutive bursts.

8. The method of claim 1, wherein said step (E3) of substantially continuously generating said correction command further includes the step of:

adding short term frequency error signal accumulated within said single burst and said long term frequency error accumulated within at least two consecutive bursts to generate a total phase error correction command; wherein said total phase error correction command is used for advancing or delaying a sample timing of a modem front end used to recover data from each said incoming from said hub burst signal having maximum/minimum amplitude.

9. In a subscriber network (sub) including a sub's clock, an apparatus for plesiochronous synchronization of said sub to a hub network; said hub network including a hub's clock, said apparatus comprising a symbol loop filter and a re-sampler; said symbol loop filter further comprising:

a short term phase error loop filter configured to substantially continuously measure a short term frequency error accumulated within a single burst; wherein said short term phase error loop filter further comprises:

a 2-nd order error loop filter configured to measure and to output said short term phase error accumulated within a single burst; and a short term error multiplexer configured to select between said short term frequency error accumulated within said single burst and a zero signal output in between at least two consecutive bursts;

a long term frequency estimator configured to substantially continuously estimate a long term frequency error accumulated within at least two bursts; and a total phase error phase register configured to substantially continuously generate a total phase correction command; wherein said total phase correction command is used for advancing or delaying a sample timing of a modem front end used to recover data from each said incoming from said hub burst signal having maximum/minimum amplitude.

10. The apparatus of claim 9, wherein said 2-nd order error loop filter further comprises:

a frequency accumulator configured to generate an integrated frequency error signal accumulated within said single burst;

a phase error detector configured to generate a phase error signal within said single burst for each said sampling instant;

and an adder configured to sum said phase error signal generated within said single burst and said integrated frequency error signal accumulated within said single burst and configured to output said short term hub's phase error signal within said single burst for each said sampling instant.

* * * * *